2,283,251

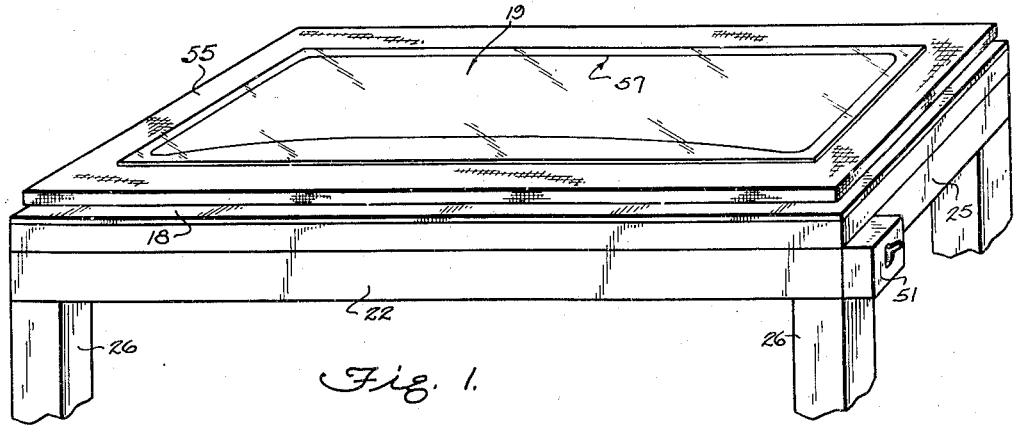
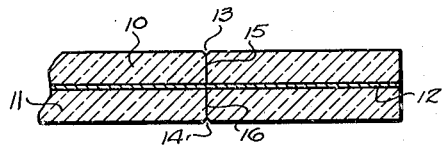
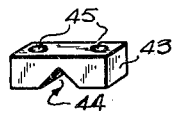
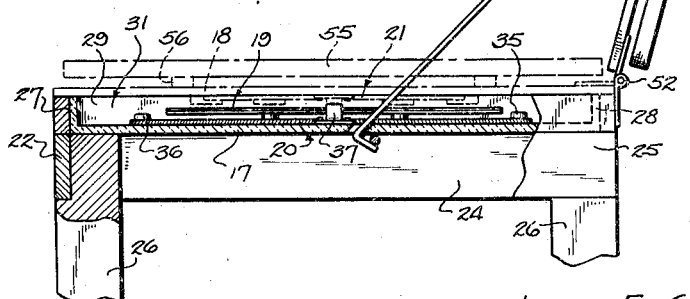

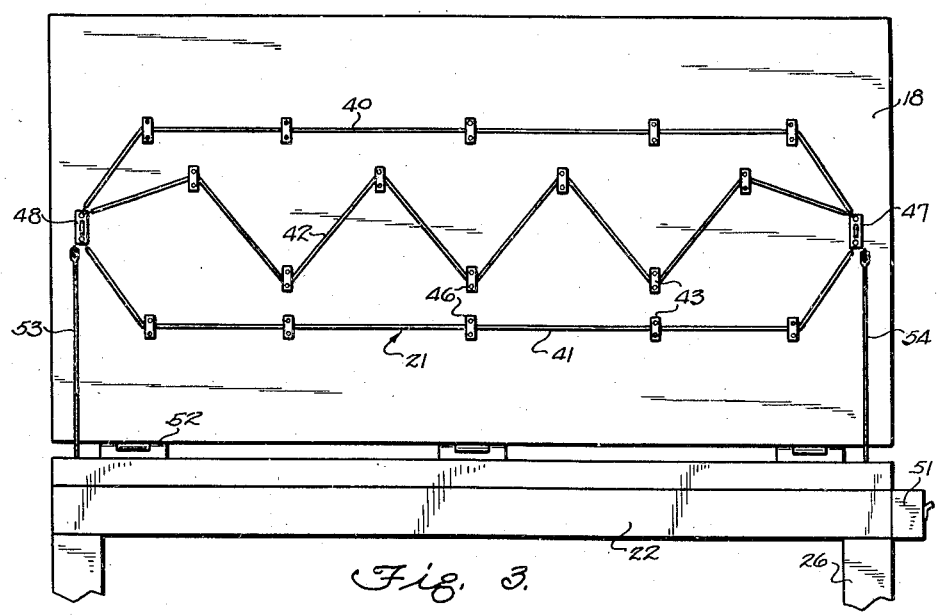
Fig. 3.
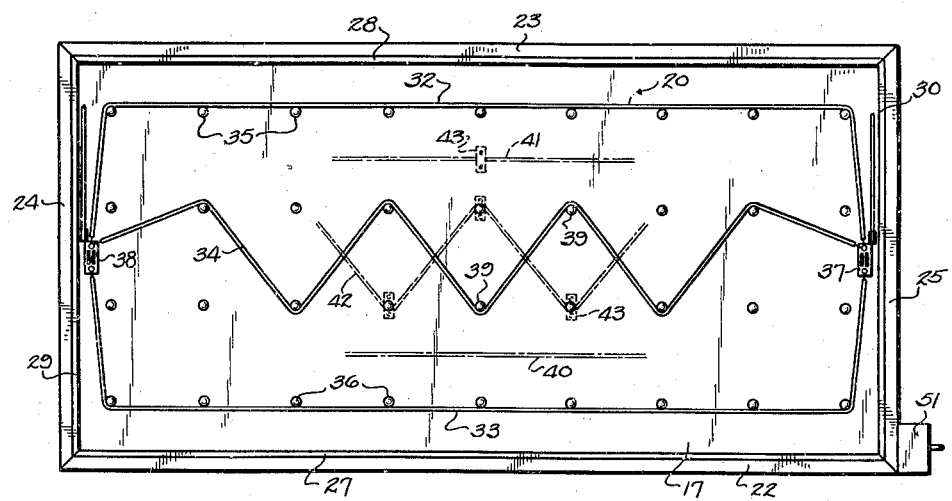
Fig. 4.
Fig. 5.
Inventor
LEON F. GUNTHER.
By Frank Fraser
Attorney Patented May 19, 1942

UNITED STATES PATENT OFFICE 2,283,251

APPARATUS FOR USE IN THE CUTTING OF LAMINATED SAFETY GLASS

Leon F. Gunther, Piqua, Ohio, assignor to Libbey-Owens-Ford Glass Company, Toledo, Ohio, a corporation of Ohio Application August 15, 1939, Serial No. 290,269

4 Claims. (Cl. 219—19)

The present invention relates to apparatus for use in the cutting of sheets of laminated safety glass, which glass usually comprises two or more sheets of glass and one or more layers of a suitable plastic material interposed therebetween and bonded thereto to form a composite structure.

This invention is particularly adapted although not restricted for use in the cutting of laminated safety glass in accordance with the general process disclosed in the patent to S. J. Lewis, 1,731,820, issued Oct. 15, 1929, and contemplates the cutting of a sheet of safety glass by first scoring the two sheets of glass along the desired line of cut and then cracking them along the score lines, heating the laminated sheet, then separating the glass sheets along the score lines, and finally severing the plastic interlayer by means of a razor blade or other sharp implement.

Heretofore, the heating of the laminated sheet, subsequent to scoring but prior to separation of the glass sheets along the score lines, has ordinarily been effected by placing electric heating coils or other heating elements upon the laminated sheet either directly above or closely adjacent the score lines to effect a localized heating of the plastic interlayer. This procedure has obviously required the individual setting of the electric coils or other heating elements for each cut, which required considerable time and effort on the part of the operator.

It is an object of this invention to provide an apparatus of novel and improved construction by means of which the heating of sheets of laminated safety glass, subsequent to scoring of the glass sheets but prior to the separation thereof, may be more readily and conveniently effected in a manner to promote rapid and accurate cutting of the safety glass.

Another object of the invention resides in the provision of apparatus of the above character operable to heat the laminated sheets substantially uniformly over their entire areas and thereby adaptable for the heating of laminated sheets of various sizes and regardless of the position of the lines of cut or whether they be straight or curved.

A further object of the invention resides in the provision of heating apparatus of the above character of relatively cheap, simple construction requiring a minimum amount of time and attention on the part of the operator and which may be used with minimum danger of breakage or other injury to the laminated glass.

Other objects and advantages of the invention will become more apparent during the course of the following description when taken in connection with the accompanying drawings.

In the drawings wherein like numerals are employed to designate like parts throughout the same:

Fig. 1 is a perspective view of heating apparatus constructed in accordance with the invention;

Fig. 2 is an end view of the apparatus, partially in section, showing the top thereof in open position;

Fig. 3 is a front view of the apparatus, with the top in open position;

Fig. 4 is a plan view of the apparatus with the top removed;

Fig. 5 is a diagrammatic view of the electrical connections between the top and bottom of the apparatus;

Fig. 6 is a perspective view of one of the clamping blocks used in the apparatus; and Fig. 7 is a section through a sheet of laminated safety glass after the glass sheets have been scored and cracked but before they have been separated along the score lines.

With reference now to the drawings, there is shown in Fig. 7 a sheet of laminated safety glass comprising two sheets of glass 10 and 11 and an interposed layer of plastic material 12. In cutting the laminated sheet, the glass sheets are first scored along the lines 13 and 14 with the score lines being opposite or in alignment with one another. The glass sheets are then cracked along the score lines 13 and 14, as indicated at 15 and 16, and either one or both of the glass sheets separated at the score line to permit access to the plastic interlayer. After the plastic interlayer has been stretched so that a slight space is had between the separated pieces of glass, a suitable cutting implement, such as a razor blade or the like, is passed through the space to sever the plastic interlayer, thereby completing the cutting operation. The present invention concerns particularly the provision of improved apparatus for heating the laminated sheet to facilitate the separation of the glass sheets along the score lines.

The heating apparatus comprises a hollow table including a bottom 17 and a top 18 between which the sheet of laminated safety glass to be heated, and indicated at 19 in Fig. 2, is adapted to be positioned. The bottom 17 and top 18 of the table carry the electric heating units 20 and 21 respectively, which are disposed beneath and above the sheet of laminated glass and adapted to effect a substantially uniform heating thereof over its entire area.

The table is made up of a substantially rectangular frame including the side members 22 and 23 and the end members 24 and 25 suitably connected together and supported by the vertical legs 26. The bottom 17 of the table is formed of a suitable insulating material and is supported upon the upper ends of the legs 26. The bottom of the table also has the marginal portions thereof upturned to provide the side walls 27 and 28 and the end walls 29 and 30 which cooperate with the bottom to define a relatively shallow pan 31 for receiving therein the sheet of laminated glass to be heated. The top 18 is of course also formed of a suitable insulating material.

The heating unit 20, carried by the bottom 17 of the table, comprises the two longitudinally extending, parallel, electric heating coils 32 and 33 positioned along adjacent side edges of the bottom and between which is arranged a longitudinally extending zigzag electric heating coil 34. The coils 32 and 33 are trained about relatively short posts 35 and 36, preferably of transit or other suitable insulating material, and are connected at one end to an electric switch member 37 and at their opposite end to a similar switch member 38. The zigzag coil 34 is trained back and forth about similar posts 39 and is also connected at one end to the switch member 37 and at its opposite end to switch member 38. The posts 35, 36 and 39 project slightly above the coils 32, 33 and 34, as best shown in Fig. 2, and are adapted to support the sheet of laminated glass 19 thereon in spaced relation to said coils.

The heating unit 21 carried by the top 18 comprises the three longitudinally extending, electric heating coils 40, 41 and 42. The coils 40 and 41 extend parallel with one another while the intermediate coil 42 is a zigzag coil. All three coils are secured in place by a plurality of locaters 43, each of which comprises a block of insulating material such as transit or the like, as shown in Fig. 6, provided with a notch 44 fitting over the coil, said block having openings 45 through which suitable fastening screws or the like 46 may be inserted. The coils 40, 41 and 42 are connected at one end to an electric switch member 47 and at their opposite end to a similar switch member 48.

The coils 40 and 41 carried by the top 18 are positioned relatively closer together than the coils 32 and 33 carried by the bottom 17 so that when the top is closed, the coils 40 and 41 will be disposed inwardly of coils 32 and 33, as indicated by the broken lines in Fig. 4. Likewise, the zigzag coil 42 carried by the top extends in a reverse manner to the zigzag coil 34 carried by the bottom so that when the top is closed, the two coils 34 and 42 are arranged one above the other in crisscross fashion, as also clearly shown in Fig. 4. This arrangement of the coils is provided in order to effect a substantially uniform heating of the sheet of laminated safety glass over its entire area.

The electric switch members 37 and 38, carried by the bottom 17, are connected by lead lines 49 and 50 in a suitable circuit for supplying electricity to the coils 32, 33 and 34. When the top 18 is closed, the electric switch members 47 and 48 interengage with switch members 37 and 38, as shown in Fig. 5, and serve to conduct the electricity to the upper coils 40, 41 and 42. When the top is raised, the supply of current to the upper heating coils is of course automatically discontinued. The supply of electric current to the lower heating coils may be controlled by a suitable switch 51 carried by the table.

After the sheet of laminated glass has been properly scored and broken along the score lines, it is placed in the table and heated to the desired temperature. Carried by the top 18 is a platform 55 covered with fabric or the like, said platform being secured to but spaced from said top by suitable spacers 56. The platform 55 is adapted to support the sheet of laminated glass during the scoring and cracking of the glass sheets and may also be used, if desired, for supporting the laminated sheet after it has been heated and while the glass sheets are being separated along the score lines and the plastic interlayer severed. However, it may not always be advisable to remove the laminated sheet from the heating compartment of the table to complete the cutting operation due to the temperature differential between said heating compartment and the room in which the table is located, which temperature differential might cause a cracking of the glass. Consequently, the separation of the glass sheets and the severing of the plastic may be carried out while the laminated sheet is disposed in the table and the said sheet permitted to remain in the table with the heat cut off so that it may cool gradually. The laminated sheet 19 in Fig. 1 is shown as being scored along the continuous line 57 to form a windshield.

It will be readily apparent that with the apparatus above described, laminated sheets of different sizes and having either straight or curved lines of cut may be satisfactorily heated. Moreover, since the sheet is heated to a substantially uniform temperature throughout, the location of the cut is immaterial. The apparatus will accommodate a relatively large number of different sizes of sheets and the necessity for the individual setting of electric coils or other heating elements to take care of each different cut is eliminated. Consequently, the cutting of sheets of laminated safety glass is greatly facilitated and expedited. This apparatus may be profitably employed by glass jobbers and glass replacement houses in the cutting of windshields and door and window lights for automobiles.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for use in the cutting of sheets of laminated safety glass including two sheets of glass and an interposed layer of plastic material bonded together to form a composite structure, a table including top and bottom members associated with one another to form a closed heating compartment within which the entire sheet of safety glass is positioned after the glass sheets have been scored and cracked along the score lines, and electric heating units carried by said top and bottom members for effecting the desired heating of the safety glass within said closed compartment, each unit comprising a pair of substantially parallel coils extending longitudinally of the table and a zigzag coil also extending longitudinally of said table between said parallel coils, the parallel coils carried by the top member being disposed out of alignment with the parallel coils carried by the bottom member and the zigzag coils carried by said top and bottom members extending in crisscross fashion when the said top member is closed whereby to effect heating of the safety glass substantially uniformly throughout its entire area.

2. In apparatus for use in the cutting of sheets of laminated safety glass including two sheets of glass and an interposed layer of plastic material bonded together to form a composite structure, a table including top and bottom members, said bottom member being formed of insulating material and having upstanding side and end walls to provide a relatively shallow pan the top of which is closed by said top member to provide a substantially closed heating compartment within which the entire sheet of safety glass is positioned after the glass sheets have been scored and cracked along the score lines, posts of insulating material carried by said bottom member for supporting the sheet of safety glass thereon, electric heating coils trained about said posts, and electric heating coils also carried by said top member, said first and second mentioned electric heating coils serving to heat the laminated sheet within said closed compartment substantially uniformly throughout its entire area.

3. In apparatus for use in the cutting of sheets of laminated safety glass including two sheets of glass and an interposed layer of plastic material bonded together to form a composite structure, a table including top and bottom members, said bottom member being formed of insulating material and having upstanding side and end walls to provide a relatively shallow pan the top of which is closed by said top member to provide a substantially closed heating compartment within which the entire sheet of safety glass is positioned after the glass sheets have been scored and cracked along the score lines, posts of insulating material carried by said bottom member for supporting the sheet of safety glass thereon, electric heating coils trained about said posts and extending longitudinally of said table, and longitudinally extending electric heating coils also carried by said top member, the coils carried by said top and bottom members being out of alignment with one another when the said top member is closed and serving to heat the sheet of safety glass within said closed compartment substantially uniformly throughout its entire area.

4. In apparatus for use in the cutting of sheets of laminated safety glass including two sheets of glass and an interposed layer of plastic material bonded together to form a composite structure, a table including top and bottom members, said bottom member being formed of insulating material and having upstanding side and end walls to provide a relatively shallow pan the top of which is closed by said top member to provide a substantially closed heating compartment within which the entire sheet of safety glass is positioned after the glass sheets have been scored and cracked along the score lines, posts of insulating material carried by said bottom member for supporting the sheet of safety glass thereon, electric heating coils trained about said posts and extending longitudinally of said table, and longitudinally extending electric heating coils also carried by said top member, the heating coils carried by said top and bottom members each including a pair of spaced, substantially parallel coils and a zigzag coil disposed therebetween, the parallel coils carried by the top member being disposed out of alignment with the parallel coils carried by the bottom member and the zigzag coils carried by said top and bottom members extending in crisscross fashion when the said top member is closed whereby to effect heating of the safety glass substantially uniformly throughout its entire area.

LEON F. GUNTHER.